No. 839,323. PATENTED DEC. 25, 1906.
D. ROSS.
GATE.
APPLICATION FILED SEPT. 20, 1906.
2 SHEETS—SHEET 1.
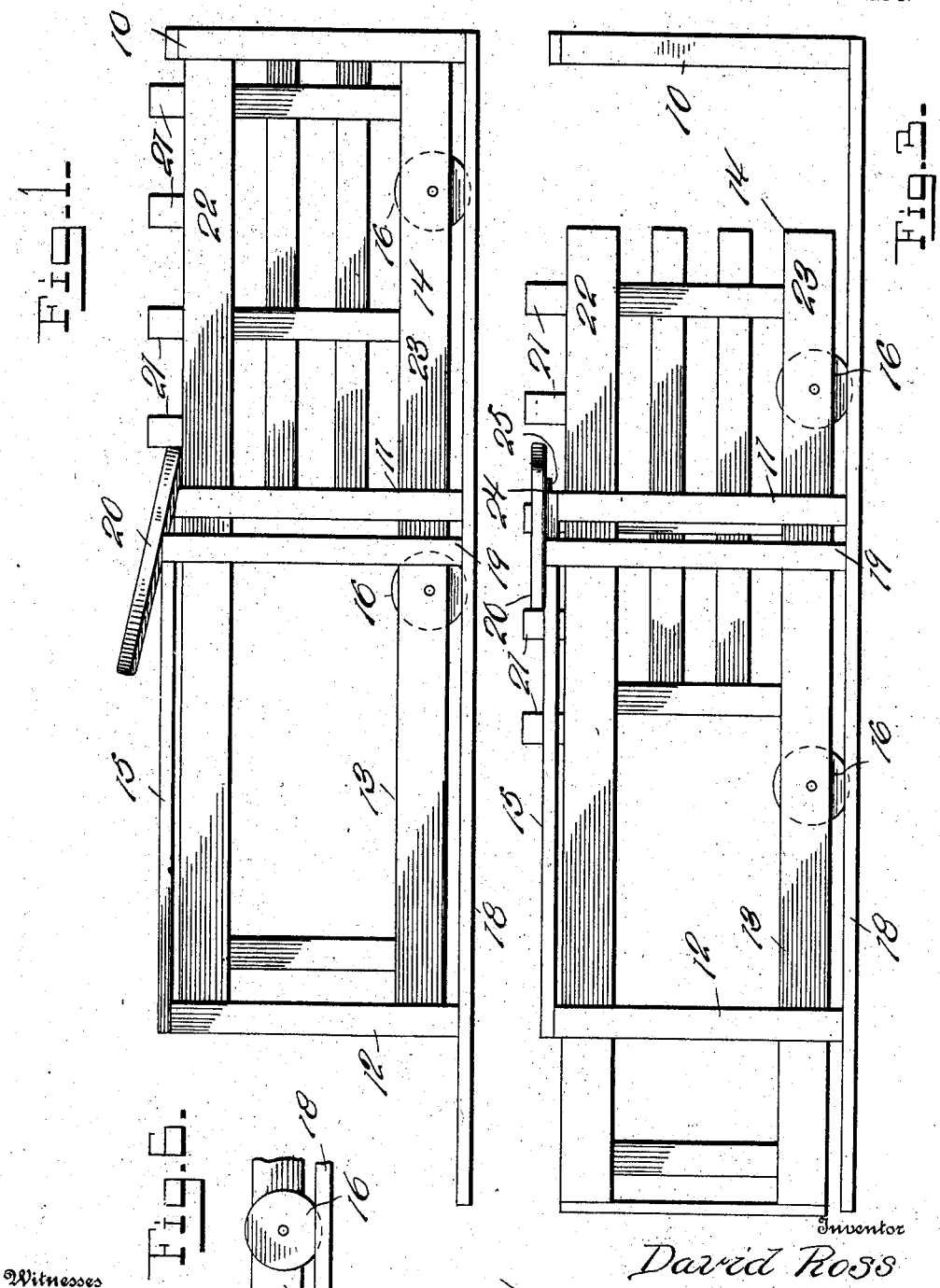
Witnesses
G. R. Thomas
F. B. MacNab
Inventor
David Ross
By Chandler & Chandler
Attorneys

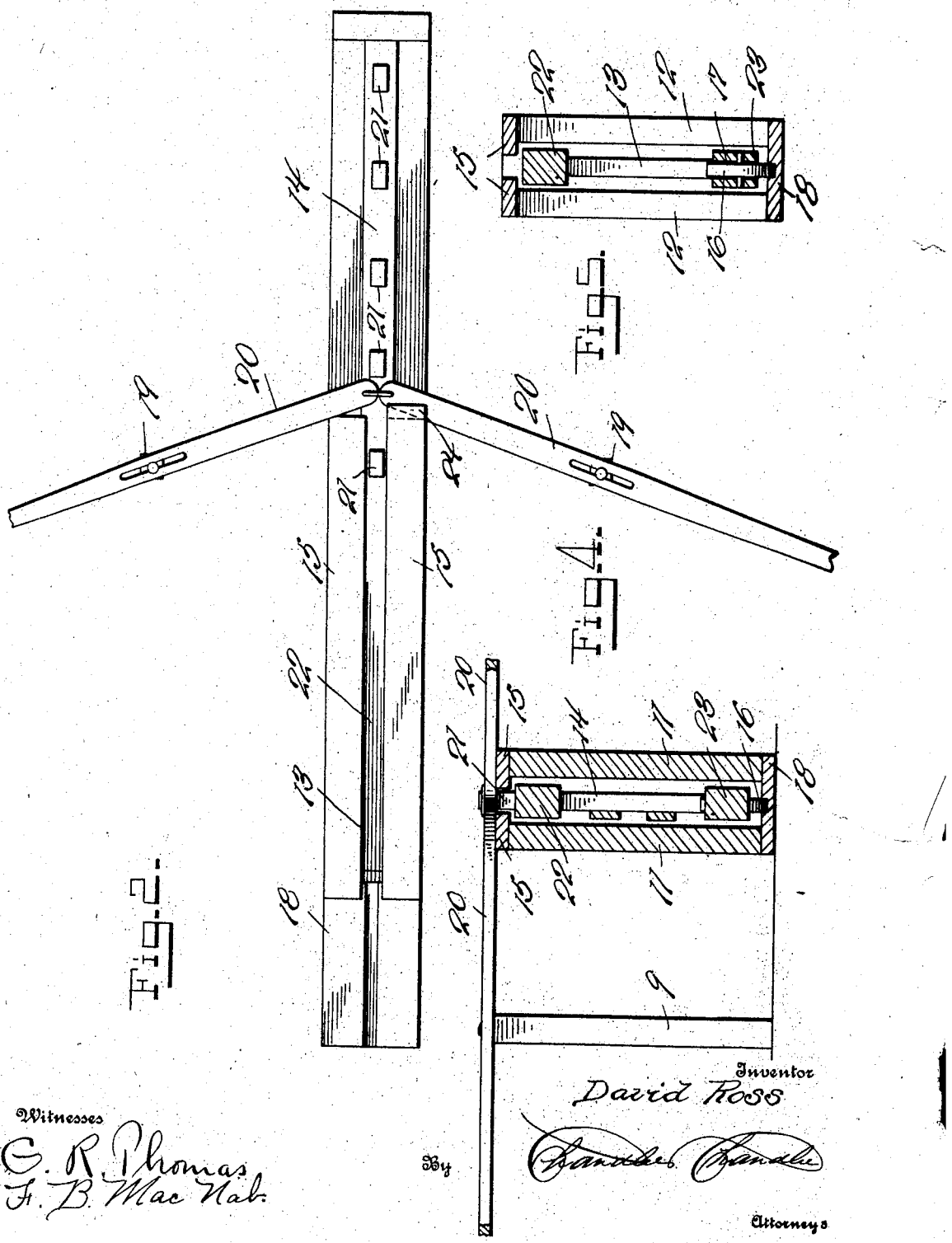

UNITED STATES PATENT OFFICE.

DAVID ROSS, OF AUGUSTA, ILLINOIS.

GATE.

No. 839,323.

Specification of Letters Patent.

Patented Dec. 25, 1906.

Application filed September 20, 1906. Serial No. 335,455.

*To all whom it may concern:*

Be it known that I, DAVID ROSS, a citizen of the United States, residing at Augusta, in the county of Hancock, State of Illinois, have invented certain new and useful Improvements in Gates; and I do hereby declare the following to be a full, clear, and exact description of the invention, such as will enable others skilled in the art to which it appertains to make and use the same.

This invention has relation to that class or kind of gates that are designed to be opened and closed by a person seated in a vehicle with a horse or team hitched thereto.

The nature of the invention embodies a pair of levers pivoted upon posts on opposite sides of the gate and linked or pivoted together at their ends, so that they can be operated upon projections extending up from the top of the gate, which is made movable endwise, and so work the said gate backward or forward, locking it finally by the extension of the inner ends of one or both levers between a projection on the top of the gate and the gate-post or its connections.

The invention is shown as embodied in the annexed drawings, forming a part of this specification, in view of which the improvements will first be described with respect to their construction and mode of operation and then be pointed out in the subjoined claims.

Of the said drawings, Figure 1 is a side view showing the gate as closed and locked. Fig. 2 is a plan of the same. Fig. 3 is a side view showing the gate as partially open. Fig. 4 is a transverse section on a plane along the inner face of the inner gate-post. Fig. 5 is a transverse section through the frame and its guides and showing a way of connecting the supporting-wheels with the invention. Fig. 6 is a detail view showing a slight modification.

Similar numerals of reference designate similar parts or features, as the case may be, wherever they occur.

In the drawings, 10 designates the two outer gate-posts, 11 the inner gate-posts, and 12 the posts for assisting in the support of guides for the frame 13 and the gate 14, connected with the frame so as to slide with it between the said posts and the spaced guide-strips 15, supported on the tops of the posts 11 and 12.

16 designates wheels of suitable size journaled in mortises 17, formed in the lower bar of the gate and frame, and arranged to traverse a track 18 as the gate and frame are moved backward and forth to open and close the former.

19 designates lever-supporting posts, one on each side of the gate and on a line preferably somewhat rearward from the line of the gate-posts 11 and preferably also higher than the latter posts. Gate-operating levers 20 are pivoted loosely on the top of the lever-posts 19 and are linked or pivoted together at their inner ends, so that the said inner ends may be operated by the manipulation of the outer arms of the levers to act successively upon the upright projections 21 on the top of the gate and move it intermittingly to open or closed position, the projections forward of the top and bottom bars 22 and 23 of the gate extending between the posts 10 and holding the forward end laterally in position.

One of the guide-strips 15 on the top of the posts 11 and 12 projects inward toward the gate from the former post, as at 24, and is offset on its under side, as designated by 25, so that the lever 20 on the side of the said guide-strip may be moved under the projecting lip 21 above the offset 25, and with the inner end of the said lever extending between the projections 21 on the top of the gate lock it in open or partially open or closed positions, as will be clearly understood.

By the construction described it will be seen that the gate may be easily and readily opened by a person in a vehicle with a team hitched thereto by short movements of the levers 20, causing their inner ends to engage the projections on the top of the gate successively and moving the said gate to open or closed or partially closed position and locking it in said position, as circumstances may require. The gate may be partially opened, so that a person may freely pass through without moving the gate, and yet keep large live stock from passing through the opening.

It is recognized that while I have shown and described the best form now known to me in which my improvements may be embodied changes may be made in the form and arrangement of parts and features of the same without departing from the general nature or spirit thereof.

What is claimed as the invention is—

1. The combination with the pairs of gate-posts and the guiding-strips on the tops of the two outer pairs of the said gate-posts, of the gate having projections on its top disposed to move between the said guide-strips, posts on opposite sides of the gate, levers pivoted on said posts and linked together at their inner ends and adapted to engage the said projections and move the gate, one of said guide-strips being extended to permit the inner end of one of the levers to be caught thereunder, and held thereby between projections on the gate to lock the latter in position.

2. The combination with the gate having projections on its upper sides and the gate-posts and other requisite supporting and guiding means for the gate, of posts higher than the gate-posts and out of line therewith, and levers pivoted on said higher posts, linked together at their inner ends above the gate and adapted to move the latter through the medium of said projections, and means connected with the gate-guiding means with which one of the levers may be engaged to lock the gate.

In testimony whereof I affix my signature in presence of two witnesses.

DAVID ROSS.

Witnesses:
E. W. PERRYMAN,
C. H. MEAD.